(12) United States Patent
Melo et al.

(10) Patent No.: US 10,972,290 B2
(45) Date of Patent: *Apr. 6, 2021

(54) USER AUTHENTICATION WITH SELF-SIGNED CERTIFICATE AND IDENTITY VERIFICATION

(71) Applicant: Beyond Identity Inc., West Palm Beach, FL (US)

(72) Inventors: Nelson Melo, West Palm Beach, FL (US); Michael Clark, West Palm Beach, FL (US); James Clark, West Palm Beach, FL (US)

(73) Assignee: BEYOND IDENTITY INC., West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,777

(22) Filed: Jul. 17, 2020

(65) Prior Publication Data

US 2020/0351105 A1    Nov. 5, 2020

Related U.S. Application Data

(63) Continuation of application No. 16/796,021, filed on Feb. 20, 2020, now Pat. No. 10,756,908.

(Continued)

(51) Int. Cl.
*H04L 9/32* (2006.01)
*H04L 9/30* (2006.01)
(Continued)

(52) U.S. Cl.
CPC .......... *H04L 9/3265* (2013.01); *G06F 16/214* (2019.01); *G06F 16/2379* (2019.01);
(Continued)

(58) Field of Classification Search
None
See application file for complete search history.

(56) References Cited

U.S. PATENT DOCUMENTS 6,335,972 B1    1/2002  Chandersekaran et al.
6,438,550 B1    8/2002  Doyle et al.
(Continued)

OTHER PUBLICATIONS

Saeedzadeh et al. "Is the only use for the private key of a root certificate signing certificates issued by it?" In Stack Exchange. Nov. 11, 2018 (Nov. 11, 2018) Retrieved on Apr. 21, 2020 (Apr. 21, 2020) from <https://crypto.stackexchange.com/questions/63865/Is-the-only-use-for-theprivate-key-of-a-root-certificate-signing-certificates-i> entire document, 2 pages.

(Continued)

*Primary Examiner* — Henry Tsang
(74) *Attorney, Agent, or Firm* — Kilpatrick Townsend & Stockton LLP

(57) ABSTRACT

In embodiments, an authentication server interfaces between a user device with a self-signed certificate and a verifying computer that accepts a user name and password. The user device generates a self-signed certificate signed by a private key on the user device. The self-signed certificate is transmitted to a verifying party computer over a network. The verifying party stores the self-signed certificate with user identification data, including at least one of a user name, user address, user email, user phone number, user tax identification (ID), user social security number and user financial account number. In subsequent communications, the verifying party receives a certificate chain including the self-signed certificate, and matches that with the user identification data stored in a database.

18 Claims, 10 Drawing Sheets

Related U.S. Application Data

(60) Provisional application No. 62/809,490, filed on Feb. 22, 2019, provisional application No. 62/842,393, filed on May 2, 2019, provisional application No. 62/857,201, filed on Jun. 4, 2019, provisional application No. 62/858,248, filed on Jun. 6, 2019.

(51) Int. Cl.

| | | |
|---|---|---|
| *G06F 16/21* | (2019.01) | |
| *H04L 9/08* | (2006.01) | |
| *H04L 9/14* | (2006.01) | |
| *H04L 29/06* | (2006.01) | |
| *G06F 16/23* | (2019.01) | |
| *G06F 21/46* | (2013.01) | |

(52) U.S. Cl.
CPC ............ *G06F 21/46* (2013.01); *H04L 9/0825* (2013.01); *H04L 9/0861* (2013.01); *H04L 9/0894* (2013.01); *H04L 9/14* (2013.01); *H04L 9/3073* (2013.01); *H04L 9/3268* (2013.01); *H04L 9/3271* (2013.01); *H04L 63/0428* (2013.01); *H04L 63/061* (2013.01); *H04L 63/083* (2013.01); *H04L 63/0823* (2013.01); *H04L 63/126* (2013.01); *H04L 2209/38* (2013.01)

(56) References Cited

U.S. PATENT DOCUMENTS

| | | | |
|---|---|---|---|
| 6,826,685 | B1 | 11/2004 | Douglas |
| 7,321,970 | B2 | 1/2008 | Watkins et al. |
| 7,366,905 | B2 | 4/2008 | Paatero |
| 7,502,924 | B2 | 3/2009 | Miller et al. |
| 7,512,974 | B2 | 3/2009 | Callaghan et al. |
| 7,788,495 | B2 | 8/2010 | Anthe, II et al. |
| 8,296,559 | B2 | 10/2012 | Parkinson |
| 8,447,971 | B2 | 5/2013 | Campagna et al. |
| 8,458,456 | B2 | 6/2013 | Niccolini et al. |
| 8,479,001 | B2 | 7/2013 | Yoneda et al. |
| 8,589,691 | B1 | 11/2013 | Hackborn et al. |
| 8,595,816 | B2 | 11/2013 | Karasawa et al. |
| 8,627,064 | B2 | 1/2014 | Salvarani et al. |
| 8,806,565 | B2 | 8/2014 | Aura et al. |
| 9,065,820 | B2 * | 6/2015 | Leggette ............... G06F 12/06 |
| 9,154,494 | B2 | 10/2015 | Campagna et al. |
| 9,178,870 | B2 | 11/2015 | Rhee |
| 9,294,468 | B1 | 3/2016 | Kilbourn |
| 9,450,764 | B1 | 9/2016 | Savant |
| 9,455,979 | B2 | 9/2016 | Blanke |
| 9,544,148 | B2 | 1/2017 | Brown et al. |
| 9,736,145 | B1 * | 8/2017 | Hayes ..................... H04L 9/321 |
| 9,742,759 | B2 | 8/2017 | Vangara et al. |
| 10,068,228 | B1 | 9/2018 | Winklevoss et al. |
| 10,110,593 | B2 | 10/2018 | Karroumi et al. |
| 10,141,128 | B1 | 11/2018 | Zhou et al. |
| 10,243,748 | B1 | 3/2019 | Callan et al. |
| 10,375,097 | B2 | 8/2019 | Kopp et al. |
| 2002/0111837 | A1 | 8/2002 | Aupperle |
| 2004/0059686 | A1 | 3/2004 | Levesque |
| 2004/0168073 | A1 | 8/2004 | Bourne et al. |
| 2006/0015729 | A1 | 1/2006 | Novack et al. |
| 2006/0264202 | A1 | 11/2006 | Hagmeier et al. |
| 2007/0130617 | A1 | 6/2007 | Durfee et al. |
| 2008/0010450 | A1 | 1/2008 | Holtzman et al. |
| 2008/0201575 | A1 | 8/2008 | Van Der Rijn |
| 2010/0082975 | A1 | 4/2010 | Metke et al. |
| 2010/0205429 | A1 | 8/2010 | Alrabady et al. |
| 2010/0332399 | A1 | 12/2010 | Benson et al. |
| 2012/0036364 | A1 | 2/2012 | Yoneda |
| 2012/0210129 | A1 | 8/2012 | Metke et al. |
| 2012/0216035 | A1 | 8/2012 | Leggette et al. |
| 2013/0145151 | A1 * | 6/2013 | Brown ................ H04L 63/0823 |
| | | | 713/156 |
| 2013/0145165 | A1 | 6/2013 | Brown |
| 2014/0129828 | A1 | 5/2014 | Rhee |
| 2014/0181506 | A1 | 6/2014 | Resch et al. |
| 2014/0281502 | A1 | 9/2014 | Keung Chan et al. |
| 2015/0256345 | A1 | 9/2015 | Vaid et al. |
| 2015/0339662 | A1 | 11/2015 | Huang et al. |
| 2016/0315777 | A1 | 10/2016 | Lloyd et al. |
| 2017/0054566 | A1 * | 2/2017 | Nitschke ............... H04L 9/3268 |
| 2018/0091314 | A1 | 3/2018 | Li et al. |
| 2018/0101847 | A1 | 4/2018 | Pisut, IV |
| 2018/0101850 | A1 | 4/2018 | Pisut, IV et al. |
| 2018/0167208 | A1 | 6/2018 | Le Saint |
| 2018/0176240 | A1 | 6/2018 | Kopp |
| 2018/0234256 | A1 | 8/2018 | Bowen |
| 2018/0295506 | A1 * | 10/2018 | Hawkes ............... H04L 63/0876 |
| 2018/0375667 | A1 * | 12/2018 | Sovio .................... H04L 9/0825 |
| 2019/0036688 | A1 | 1/2019 | Wasily et al. |
| 2019/0052617 | A1 | 2/2019 | Chen et al. |
| 2019/0068580 | A1 | 2/2019 | Amid |
| 2019/0074982 | A1 | 3/2019 | Hughes |
| 2019/0075099 | A1 | 3/2019 | Brouchier et al. |
| 2019/0164156 | A1 | 5/2019 | Lindemann |

OTHER PUBLICATIONS

Notification of Transmittal of the International Search Report and the Written Opinion of the International Searching Authority received in the PCT/US2020/019349 dated May 15, 2020, 28 pages.

U.S. Appl. No. 16/796,107, "Notice of Allowance", dated May 15, 2020, 18 pages.

U.S. Appl. No. 16/796,211, "Non-Final Office Action", dated Jun. 11, 2020, 12 pages.

U.S. Appl. No. 16/796,277, "Non-Final Office Action", dated Jun. 2, 2020, 20 pages.

U.S. Appl. No. 16/796,277, "Final Office Action", dated Aug. 11, 2020, 26 pages.

U.S. Appl. No. 16/796,211, "Notice of Allowance", dated Aug. 12, 2020, 12 pages.

U.S. Appl. No. 16/905,854, "Non-Final Office Action", dated Sep. 3, 2020, 27 pages.

U.S. Appl. No. 16/905,854, "Notice of Allowance", dated Nov. 19, 2020, 18 pages.

* cited by examiner

USER AUTHENTICATION WITH SELF-SIGNED CERTIFICATE AND IDENTITY VERIFICATION

CROSS-REFERENCES TO RELATED APPLICATIONS

The present application is a continuation of U.S. application Ser. No. 16/796,021, filed Feb. 20, 2020, which claims the benefit of U.S. provisional application Ser. No. 62/809,490, filed Feb. 22, 2019, entitled "Digital Signature System to Replace Passwords;" Ser. No. 62/842,393, filed May 2, 2019, entitled "Digital Signature System to Replace Passwords;" Ser. No. 62/857,201, filed Jun. 4, 2019, entitled "User Authentication System with Self-Signed Certificate and Identity Verification;" and Ser. No. 62/858,248, filed Jun. 6, 2019, entitled "User Authentication System with Self-Signed Certificate and Identity Verification," the disclosures of which are incorporated by reference herein in their entirety.

BACKGROUND OF THE INVENTION

The present invention relates to replacing passwords with user public/private key certificates.

Currently, many websites and applications require a user login and password for access. Each new web-site requires a different user-name and password. Password managers have been introduced that consolidate them under just one password, and two factor authentication is sometimes used to improve security, but none of these approaches actually eliminates passwords or improves the user experience. Meanwhile, passwords are now the most common security breach in computer systems. Phishing expeditions continually deceive naive users into revealing their passwords, or criminals successfully guess those most commonly used. The password concept is broken—password convenience is overridden by the losses incurred.

TLS (Transport Layer Security) and its predecessor, SSL (Secure Sockets Layer) are Internet standards for two things: 1) services (servers) authenticating themselves to users (clients), and 2) encrypting messages that are decipherable by only the two parties in the connection. SSL was created by Netscape in 1995 and renamed to TLS when made into a standard.

Server Certificates. TLS uses X.509 certificates, each of which have a digital signatory. The signatory itself must also have a certificate, which has a second signatory. And that second signatory possesses a certificate with a third signatory, and so forth, leading to a chain of certificates. Starting with a root signatory, each certificate signs the next until reaching the server's (end entity) certificate, which is the last ("leaf") certificate (the certificate used to access a website server). A leaf certificate cannot be used to sign other certificates. According to the TLS protocol, this chain starts with a self-signed certificate, which is from a single, universally-trusted root.

For simplicity and authentication convenience of services, this trusted root certificate has been included in a select group of root Certificate Authority (CA) certificates. Any CA in this select group can sign other certificates. The select group can vary in size, but membership is determined by a consortium of browser vendors, Operating Systems vendors, and Certificate Authorities called the CA/B Forum.

Trust in a leaf server certificate is established the client validating the signature of each certificate in the server's chain in reverse order, starting with the leaf. Encountering any trusted and validated certificate from this select group establishes trust in the leaf certificate. A second test challenges the server to prove it possesses the correct private key for the leaf certificate. Success in both of these tests is necessary for an authenticated, trusted connection.

Mutual Authentication. TLS was symmetrically designed to allow both services and users to be authenticated using certificates, called mutual TLS. Client-certificates, like server-certificates, were expected to use an external, trusted, third-party signatory in their chain-of-trust that is trusted to undertake the burden of establishing the user's actual identity. It was recognized already in 1995 that there were problems with this approach. First, few CAs would take the job of certifying the identity of individuals needing certificates. Second, any given service might not trust any given CA to certify its users. Third, user-certificate CAs were an enormous additional bureaucracy. Hence, user-certificates were deemed to be not viable for normal users of the Internet, and from the outset, the common user-name/password was instead adopted for user-authentication.

Currently, a Public Key Infrastructure (PKI) exists to allow users to verify the identity of a website, to make sure they are communicating with the correct entity. Public/Private key encryption is used for site authentication. A trusted, third-party Certificate Authority (CA) can be used to authenticate the identity of a website. In this process, the owner of a domain generates a public/private key pair. The public key of the website is wrapped in a Certificate Signing Request (CSR) along with other information, and it is signed with the private key. This CSR is submitted to the CA for the creation of a Certificate. The trusted CA validates the ownership of the website's web address using whatever means determined by that CA to be necessary and sufficient. The CA then uses the private key of an intermediate certificate, which was itself signed by a root certificate, to sign a Certificate for the website. The signed website certificate is referred to as a leaf certificate, which identifies the website but cannot be used to sign other certificates. The website leaf Certificate thus links to the trusted CA's own trusted certificate, referred to as a root certificate, by way of the intermediate certificate that signed it, forming a chain of certificates. By trusting the CA's root certificate, any client connecting to the website can trust the leaf certificate presented by the site as a valid identity of the website. Let's Encrypt® is the most common root certificate CA today.

Consumer Device makers have incorporated hardware security modules (HSMs) to store encryption keys, biometric data (for fingerprint and face recognition authentication). WebAuthn is a proposed standard by the W3C with input from the FIDO alliance, of which Google is a part, that uses asymmetric, public/private encryption as a mechanism for second authentication factor. The private key can be stored internally in a consumer device's HSM or in a special, separate key-storage device. The proposed standard has multiple private keys, one per site, and requires new keys in the event of a lost device.

People have difficulties remembering passwords, so they often use the same password everywhere. Moreover, passwords are cryptographically weak credentials, as they can be guessed and are shared secrets. In the past ten years, mobile devices have caused a proliferation of Internet accounts, which has stimulated demand for credential alternatives.

As detailed above, TLS has been limited by the need for third party CAs. Many companies offer alternative client credentialing systems that do not use TLS, including two-factor authentication, password managers, and many other systems to augment the standard password. A few use TLS for client-authentication, but paired with PKIs (Public Key Infrastructures) that operate a Certificate Authority (CA) to issue certificates to specific individuals for use with the service. There are a number of described uses of self-signed certificates to authenticate a particular device, such as Published Application US 20130145151 (device authentication), Published Application US 20120036364 (network device, such as a camera), and Published Application US 20190075099 (for virtual servers, with a broker).

Starting with the FIDO Alliance almost ten years ago up to today's WebAuthn consortium of companies (notably, Google) and many other companies have devised alternatives to avoid the perceived deficiencies of TLS for client-authentication but still use TLS for server authentication and encrypted communications.

It would be desirable to have a password replacement that is easy to use, can be used across multiple devices, and allows recovery in the event of a lost device.

BRIEF SUMMARY OF THE INVENTION

In embodiments, an authentication server interfaces between a user device with a self-signed certificate and a verifying computer that accepts a user name and password. The user device generates a self-signed certificate signed by a private key on the user device. The self-signed certificate is transmitted to a verifying party computer over a network. The verifying party stores the self-signed certificate with user identification data, including at least one of a user name, user address, user email, user phone number, user tax ID, user social security number and user financial account number. In subsequent communications, the verifying party receives a certificate chain including the self-signed certificate, and matches that with the user identification data stored in a database.

In embodiments, a signing application is downloaded to the user device over a network. The signing application creates a root private key used to sign the self-signed certificate. The root private key is then stored in a secure enclave on the user device, or is sent to an external Credential Recovery Service server accessible over the network for storage, then is deleted from the user device.

In embodiments, a system and method replace multiple passwords with one or more user certificates created and signed using public/private key encryption under the supervision of the user. The system inverts the normal certificate process, with the user supervising their own Certificate Authority in concert with one or more Trusted Devices in the user's possession. This system recognizes that, like a password system, the user does not need to be independently identified by a third party, but merely be able to present the same credential repeatedly to confirm the same user accessed the website/application before.

In embodiments, the user generates their own public/private key pair, and the private key is used to sign a root certificate of the user acting as a Certificate Authority (CA), with the root private key stored offline. An intermediate private key is generated on the secure enclave (e.g., HSM) of a user's device. The corresponding public key is then included in a new Intermediate Certificate which is signed by the user's root private key, and references the User's Root Certificate through a chain-of-trust. This chain is then used to verify the user to a verifying party, with the verifying party able to follow the chain to find the user's public key in the signed root certificate.

Essentially all existing credentials today are based on the user-name combined with a password. Thus, conversion to a certificate-based system as specified herein is problematic. What is needed is a system that allows change gradually, as users and websites adopt the certificate system, and as websites have some users on a legacy password system, and others on a certificate system. Such a system is provided by redirection to the authentication server of the present invention.

In embodiments, the user's root private key is stored not on the device, or in a HSM of the device, but rather externally. For example, the root private key can be stored on a USB drive, printed as a QR code, or stored at a third party secure digital storage facility. Recovery from loss of all devices is achieved by reading the root private key and root certificate from offline-storage and again signing an intermediate certificate on a new device, thereby re-establishing a chain-of-trust that anchors on the user's root certificate.

In embodiments, the user can easily migrate trust to another device by providing the root certificate and intermediate certificate as a certificate chain to a second device, which then adds a new intermediate certificate to create a longer certificate chain with the same root certificate. In this process, the second device generates a public/private key pair in its secure enclave and sends a certificate signing request to the first device, which validates the request and uses it to extract the second device's public key, signing and returning a new intermediate certificate, with an updated chain to the second device.

In embodiments, A redirecting module redirects the self-signed certificate chain to an authentication server. The authentication server is also provided a user name, password and verifying computer address, which is stored in a password database by the authentication server, in association with the self-signed certificate. Subsequent communications intended for the verifying computer with the self-signed certificate are redirected to the authentication server, which looks up the associated user name and password and transmits the associated user name and password to the verifying computer.

Any device in possession of an intermediate certificate and its corresponding private key has the ability to sign new leaf certificates to be used by other applications to authenticate into verifying party services.

In an alternate embodiment, a single-certificate TLS credential is constructed and used to authenticate the user to verifying parties. A database of information, including private keys, is stored on the hard disk of the Trusted Device. The private keys are securely migrated from the database to other devices. The key database is securely backed-up to a cloud-based recovery service allowing restoration of the database. The addition of new keys to other user devices is accomplished using secure synchronization of the database between existing Trusted Devices.

DETAILED DESCRIPTION OF THE INVENTION

Overview

Figure 1:
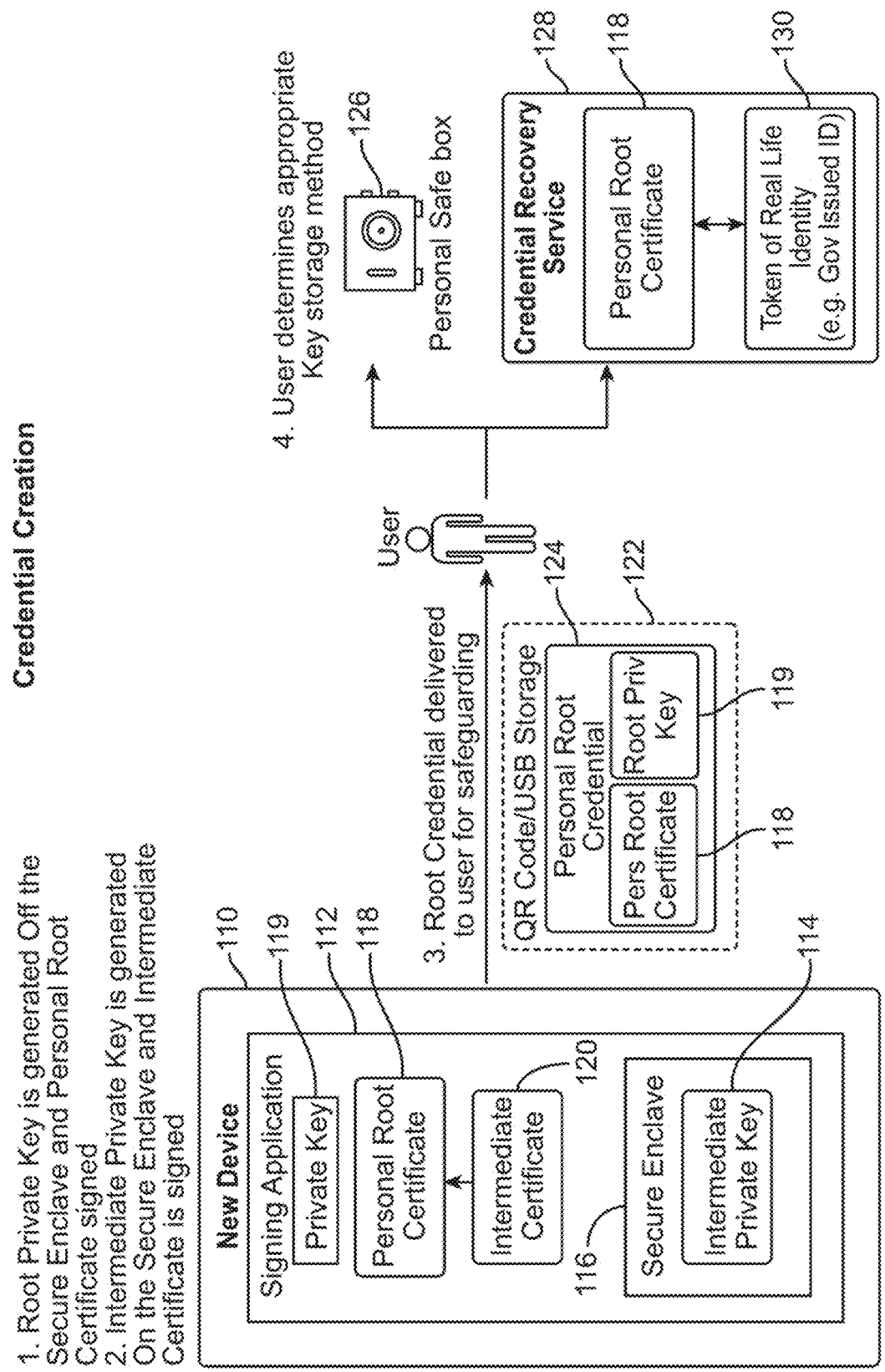
FIG. 1 is a diagram illustrating the creation of a Personal Credential System and its installation on a newly Trusted Device according to an embodiment.

The present invention leverages the availability of TLS on web servers. The present invention provides a way to use TLS with self-signed certificates, eliminating the need for external, third-party CAs, and obviating the need for the WebAuthn and other alternatives for client authentication.

Self-signed User Certificates. A self-signed certificate used with TLS cannot alone authenticate a specific individual, but it does achieve an essential part of the authentication process: it guarantees possession of the private key by the client presenting a certificate. When the chain validation process and challenge/response are successful, then by definition the client initiating the connection indisputably possesses the private key and therefore owns the public-key certificate used to make that connection. But a self-signature cannot establish identity, as anyone could otherwise claim to be someone else. However, the self-signed certificate will uniquely identify the same individual in the database, just as a password does. No external CA and no password is needed.

Cryptographic Credential. A service is connected via TLS using a validated, self-signed certificate. The service then separately and independently determines the connecting individual's actual identity, and creates a database record for that individual containing the certificate. Then, when a self-signed certificate is subsequently presented in a connection and is affirmatively compared against the certificate database entry of the individual, it securely identifies the specific user.

The service essentially "completes" the certification that would have been done in an external, third-party CA. But because the user-identity was determined after the certificate was issued, it cannot be represented in the certificate itself. Rather, a second step of comparison against the self-signed certificate in the service's list of users is required to establish identity using the certificate.

First-time Process Example. When signing up for a service for the first time, in step 1) a client creates and presents to the service a self-signed public key certificate, which is created from a private key that is kept secret. In step 2), the service verifies all information it needs from the connection to establish the identity of the specific individual, then creates a new-user database record that contains the public-key certificate along with that individual's identifying information.

Subsequent Log-in Example. Step 1) a client presents the same certificate and the service validates the certificate chain-of-trust and performs a challenge/response to ensure certificate ownership (with TLS, this is done automatically). Step 2) the service compares the presented certificate with certificates in the service's database. If both steps are successful, the certificate belongs to and is a credential identifying the existing user and specific individual in the database.

Delete User Example. Either Certificate Invalidation or removal from the database deletes a user.

The present invention turns the third-party CA chain-of-trust concept upside down and inverts it to let the user self-sign a root CA Certificate containing only their public key.

The server's chain-of-trust mechanism is fundamental to PKI operations for the Internet and has been well established for over twenty years, but user certificates present unique problems. Foremost is the scale problem of vastly more users than servers. Further, unlike stationary servers that are maintained by professionals, users frequently own multiple devices and sometimes misplace or lose them.

In the existing process, getting a user-certificate requires the applicant to create a Certificate Signing Request containing user-specific information plus a public key, which is signed with the private key counterpart. The external trusted CA verifies the signature of the CSR. Also, the CA verifies all user-specific information, using whatever means it considers sufficient. It then signs the certificate, attesting to its veracity. For everyday users, this is highly burdensome compared to passwords, but even worse, it requires that the user re-establish themselves with the third-party CA even to add a new device. With the usual third-party CA, the user-specific information in the certificate, such as email address, organization, etc., specifically identifies the owner.

The present invention eliminates the use of an external CA in order to validate users. In a traditional system, the CA attests to the public key plus other information, such as email address, domain name, et cetera, belonging to a specific individual. In the present invention, everything but the public key is eliminated, so that the certificate contains no user-specific information. Thus, the CA is verifying only the public key. But that assurance comes from the applicant via the CSR, signed by the applicant's private key. In this reduced case, then, the external CA serves no purpose, and it can be replaced by a root CA certificate containing the applicant's public key signed by the companion private key. Logically, a private key in possession of its owner has to be accepted because it is indisputably true. We thus eliminate the external CA, and instead present credential in the form of a chain-of-trust with the user's Personal Root Certificate at the end.

In the presented invention, the user uses devices containing HSMs to create user digital signatures without involving external CAs, which migrate readily to any number of other devices, easily recover from lost devices, recover from catastrophic loss of all devices, and are easier to use than user-name/passwords.

The user-generated certificate of the present invention, like a user-name/password, is not intrinsically associated with anyone, and any use of it to identify an individual by a website must attach information about the individual, just as with a password login. For example, a website can ask for the user's name, address, email, phone number, tax ID, social security number, credit card number, etc. The service establishing trust in an individual puts the individual's information in their database, but this needn't be in the certificate itself—the certificate is just a signature. Unlike a password, however, it can't be stolen (it's "public") and it can't be modified. It is just as easy to use, but far more secure.

With the additional information about the user eliminated from the certificate, there is no problem trusting it—any self-signed certificate minimally attests that the public key it contains is the counterpart to the private key used by the signer. Eliminating everything but the public key makes the certificate indisputably trustable—it only attests to its public key, which is signed by its private key.

The user-certificate process according to the present invention is as simple as choosing a user-name and password while producing a unique "signature" that can't be hacked, and it allows the user to migrate trust to any new device.

Certificate Authorities have typically been utilized as external to the user, with a user requesting a signed certificate by the authority in the form of a Certificate Signing Request. Eliminating the third-party signer enables the user to establish a signature, but not a specific personal identity. With the software tools to generate certificates and sign them, this capability is given to any user, allowing this solution to be scaled. The user becomes their own CA.

The present invention also allows users to migrate their signature to new devices with ease. Any user can generate any number of intermediate certificates for separate devices, with the convention that the root CA, i.e. the last link in the chain of trust, identifies the owner with its public key—it's the anchor certificate in PKI parlance.

A Personal Root key pair and associated self-signed certificate are generated with an appropriate app on a first device, such as a mobile phone. Before exporting the Personal Root Private Key to cold storage, it is first used to sign an intermediate signing certificate of a public/private key pair that is generated by the device's HSM. Because it is signed by the Personal Root Private Key, its chain-of-trust includes the Personal Root Certificate. Most importantly, not only can it sign leaf certificates for any services to be authenticated on it, but also it can sign a new signing certificate for any new device.

All such devices therefore have similar capabilities, because all hold intermediate certificates that can sign for other intermediate and leaf certificates. The only differences between them is the number of links leading to the Personal Root Certificate.

The user may have several options for offline storage. For example, it might be printed out as a scannable QR code on a piece of paper, or on non-volatile electronic storage, that might be kept in a safe-deposit box or other safe physical place. It might also be stored encrypted in an online key repository that has a rigorous process for re-establishing ownership and decrypting it.

Because each device can operate the user's Personal CA, the chain for which has the same Personal Root Certificate, any device can replace any other lost device by creating a new signing certificate for the replacement device. Armed with the new signing certificate so issued, all applications re-installed on a new device would get new leaf certificates from the device's CA. Because the Personal Root Private Key has not changed and it contains the public key ID of the owner, the service's authentication code needs no change; the new leaf certificate, with its chain-of-trust, is simply presented at authentication time. The service's authentication code checks the new chain leading to the Personal Root Certificate, the Personal Root Public key of which will be an existing user.

This process of allowing a user to sign their own certificates leaves the recovery and migration of the user's credentials completely within the user's control. The details of the implementation make this process of migration and recovery very simple for the user. Using the invention is no more difficult for the user than retrieving a password manager and reinstalling it on a lost device. The system thus readily replaces user-name/passwords with a parallel equivalent system that is incomparably more secure. The public key on the root certificate signed by the user's private key is the actual public root credential of the user.

Definitions

A Client Application is a software module downloaded to and running on a user's device which is in possession of a leaf certificate signed by the Personal Certificate Authority for the purpose of authenticating the user when connecting to a Verifying Party (e.g., a web resource).

A Credential Recovery Service is an internet service that stores the Personal Root Credential in secure storage vault on behalf of the user. The user uses separate credentials, or a combination of multiple credentials to access the credential stored in the vault.

A Data Block is a discrete binary block of data that is stored and communicated between trusted devices and a cloud back-up service.

A Data Block Handle is a randomly-generated unique identifier in either binary or string format for uniquely identifying a block of data on trusted devices and cloud back-up services. It is generated in such a way that collisions between the generated handles on two separate trusted devices will not likely collide with each other. In industry parlance, this is called a Globally-Unique Universal Identifier (GUID).

A Data Bundle is a combination of a Data Block and an identifying Data Block Handle.

A Data Bundle Set is a collection of data bundles, each with a unique data block handle.

A Key Store is a database of private keys and certificates stored on a device's hard disk, encrypted by a key to prevent reading. The encryption key may be the device key for the device's secure enclave. This key store can perform signing operations similar to those of an enclave. Unlike an enclave, the key store can import private keys that are generated in software, and export private keys for later migration.

A Personal Certificate Chain is any certificate chain that validates to a Personal Root Certificate as a root certificate.

A Personal Certificate Authority is the virtual infrastructure comprised of:
  A Personal Root Certificate which is a certificate at the top of the Personal Certificate Chain of a user. It has the capability to sign other certificates, (i.e. operate its own Certificate Authority). This certificate is trusted by the Verifying Party to authenticate an individual user.
  A Personal Root Credential which is the entity consisting of the combination of the Personal Root Private Key and the Personal Root Certificate. It should exist in the Trusted Devices only during Personal Certificate Authority creation and recovery. At all other times, only the Personal Root Certificate is used to authenticate the user to the Verifying Party.
  A Personal Root Private Key which is the private key used to sign the Personal Root Certificate. Except at times of user credential creation or restoration, this key is never accessed or used by the system. It can be kept in cold storage, or stored on a cloud-based Credential Recovery Service.

A Rendezvous Service is mechanism by which two devices (e.g., network connected) exchange information and agree on a shared secret used to establish a channel of communication (e.g., via cloud service).

A Rendezvous Token is a large, random, time-gated shared secret which two clients use to establish a channel of communication (e.g., directly or via a central cloud service that will relay the messages between them).

A Self-signed leaf certificate is a Personal Certificate Chain of length 1, in which the single certificate acts as both the Personal Root Credential and the leaf certificate in a TLS handshake.

A Service Identifier is a unique string or number presented by the Client Application during client certificate signing that uniquely identifies the service requesting a self-signed leaf certificate. In one embodiment, this can be a string formatted as a reverse DNS name of the verifying party's server (e.g. com.example.www).

A Self-signed leaf package is a collection of: a Self-signed leaf certificate, its accompanying private key, and the ID of the service at which this credential is registered.

A Signing Application is a software module that runs on a user's device that contains the private keys and software necessary for the operation of the user's Personal Certificate Authority.

A Trusted Device is a user's personal computer device that contains a Signing Application initialized with an intermediate certificate capable of signing a certificate on the user's Personal Certificate Chain.

An Untrusted Device is a user's personal computer device that doesn't yet contain a Personal Certificate Leaf and Personal Certificate Chain.

User Credentials are the presentation of a cryptographically-signed payload, who's signing origins can be traced to possession of the user's Personal Root Certificate private key via a chain-of-trust validation mechanism.

A Verifying Party is any computer service that needs to authenticate a user's credential (e.g., in order to properly, safely and securely operate).

Introduction

The below description describes a mechanism for maintaining and presenting User Credentials to Verifying Parties in the form of a Personal Certificate Chain, validating to a Personal Root Certificate. A Personal Root Certificate is specified as the trust anchor of the User Credentials.

The subject field of the Personal Root Certificate is irrelevant to the described system. The Personal Root Public Key embedded in the Personal Root Certificate is the credential used to identify a given user.

The Personal Root Certificate is configured with the ability to sign other certificates, allowing it to operate a Certificate Authority, signing intermediate certificates in the Personal Certificate Chain.

The Personal Root Certificate acts as the trust anchor of a Personal Certificate Authority issuing certificates in the Personal Certificate Chain of a specific user, signing certificates and other credentials using the user's Trusted Devices, coordinated with each other using various Rendezvous Mechanisms. The private key of the Personal Root Certificate, called the Personal Root Private Key, is not stored on any of the user's trusted devices. It is only used to restore the user's credentials in the event of a total loss of all of the user's Trusted Devices. The Personal Root Private Key can be kept in cold storage, or in a Credential Recovery Service on the cloud. The intermediate private keys used for signing additional intermediate and leaf certificates in the user's Personal Certificate Chain are created and stored within the HSMs of the Signing Application on the user's Trusted Devices. There is no need to export the intermediate private keys in order to operate the credential system. New trusted devices can be added to the system by extending the user's Personal Credential Chain by one intermediate certificate. The new intermediate certificate is signed by the Intermediate Private Key on any of the user's Trusted Devices via the Rendezvous Mechanism.

Once initialized, the system can deliver any number of credentials that utilize Personal Certificate Chains for user authentication. It can sign leaf certificates for use in mutual TLS connections, or be embedded in a JSON Web Token for non-TLS challenge/response, or sign a challenge in a Web-Authn interaction. Because the Verifying Party uses the user's Personal Root Certificate to authenticate the user, the user can easily migrate and recover lost credentials by signing new certificates on their Personal Certificate Chain, without direct involvement of the Verifying Party, simplifying the operational load on the Verifying Party servers.

In an alternate embodiment, the Personal Root Certificate need not be a self-signed root certificate of the user as Certificate Authority. It may be an intermediate certificate on a larger chain, signed, or cross-signed, by any other Certificate Authority. Where on the chain the Personal Root Certificate sits is less important than the fact that any valid chain that contains the certificate containing Personal Root Public Key authenticates the user. A Personal CA's chain of trust as described herein, coupled with the existing mechanism of cross-signing a Personal CA, allows the signing CA (a corporate or government CA) to attach attestations to an existing Personal CA. This mechanism allows interoperability between our Personal CA and existing Certificate Authorities.

Certificate Authority Operations

This section describes the initialization and operations that can be performed on a user's Personal Certificate Authority.

Creating the Personal Certificate Authority

FIG. 1 is a diagram illustrating the creation of a Personal Credential System and its installation on a newly Trusted Device according to an embodiment. A user device 110 (e.g., smartphone, tablet, computer, etc.) downloads or otherwise installs a signing application 112. The signing application includes the ability to create a private key 119 outside a secure enclave 116 (such as in an external QR Code or USB Storage 122). Personal Private Key 119 is generated outside of the HSM of the device 110, and us used to self-sign the Personal Root Certificate 118, and is then used to sign an intermediate certificate 120. The Personal Private Key is erased after being stored offline, outside the device 110 (such as in a personal safe box 126), as described below.

This section describes the initial creation and set-up a user's first Trusted Device in their Personal Certificate Authority. This process is illustrated in FIG. 1. The user installs the Signing Application 112 onto one of their devices 110 and begins the initialization process. The Signing Application 110 generates a new Personal Root Private Key 119 outside of device's hardware Secure Enclave 116 and uses it to create and sign the user's Personal Root Certificate 118.

Together, the Personal Root Private Key 119 and the Personal Root Certificate 118 are referred to as the Personal Root Credential.

An Intermediate Private Key 114 is generated within the hardware Secure Enclave 116 of device 110 at the request of the Signing Application 110. The Intermediate Private Key 114 is generated by the Secure Enclave 116 and its public key is used to create an Intermediate Certificate 120, which is signed by the Personal Root Private Key 119. The intermediate private key 114 can be used to sign other intermediate certificates or sign leaf certificates for credential delivery.

A Personal Root Credential 124 (consisting of Personal Root Certificate 118 and Root Private Key 119) is presented in a format for cold storage or storage in a Credential Recovery Service. In one embodiment, the Personal Root Credential 124 is imbedded in a QR code, bar code or is otherwise encoded, optionally encrypted and printed. Alternately, Personal Root Credential 124 is written to a USB dongle, a CD, or another memory or physical device. In another embodiment, Personal Root Credential 124 is backed up at a third party trusted Credential Recovery Service 128. FIG. 1 shows the example of the entire Personal Root Credential 124 being stored. The Credential Recovery Service 128 may require a login and password, and/or other identifying information to recover the Personal Root Certificate 118, such as a token of a government issued ID 130. This could be a driver's license number, social security number, etc. Once backed up, the Personal Root Private Key 119 is deleted from the Signing Application 112 and is not requested again unless it is required for Credential Recovery.

In an alternate embodiment, only the Root Private Key is stored externally to the user device in cold storage. The Root Private Key can be used to generate an exact copy of the original Personal Root Certificate. This can be done by knowing (in the Signing Program) and using the same data for the other fields of the Personal Root Certificate. E.g., the same maximum expiration time, extensions, etc. A type of key with randomness in its signature (e.g., Elliptical Curve keys) is avoided, and instead, for example, RSA keys could be used.

Figure 9:
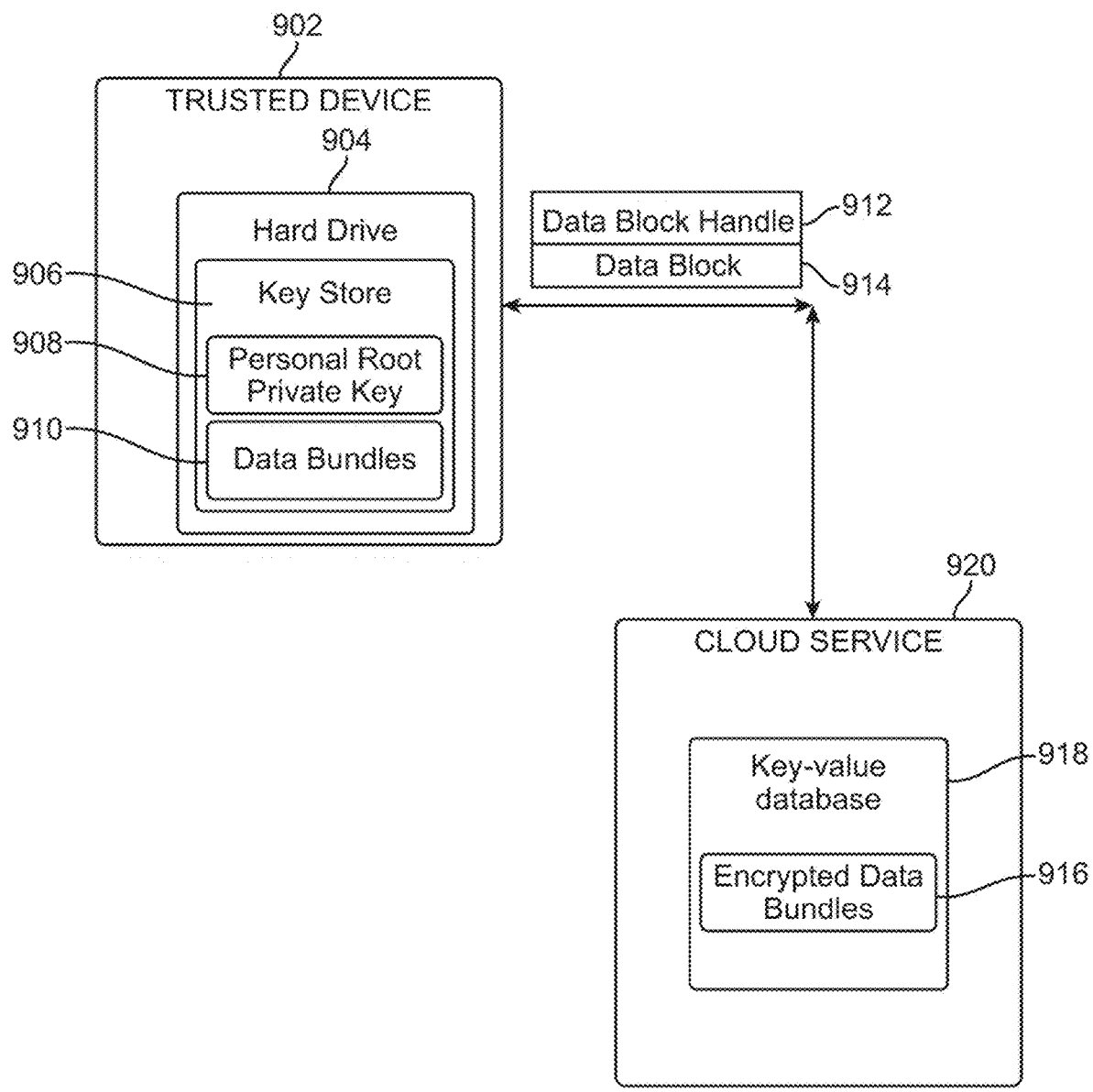
FIG. 9 is a diagram illustrating an alternate embodiment with a single-certificate TLS credential.

In one embodiment, illustrated in FIG. 9, the Personal Root Private Key 908 is retained and stored in a Key Store 906, rather than a secure enclave, for later use in data block 914 migration and back-up.

Credential Migration

A problem with using certificates for user-authentication arises because of key protection systems on mobile devices—systems that do not allow export of the private key. The private key is held in a Hardware Security Module (HSM), which is a separate processor that creates private keys, their public keys, and does all processing needed of them. This obviously presents a problem when a device is lost or a new one is purchased, because the keys disappear when the device is erased. The present invention provides a solution to mitigate this situation.

Private Keys, public keys, certificates, and so forth can still be created without using a HSM. The first step in the solution is to create a self-signed root signing (CA) certificate without using the HSM. Second, create within the device's HSM a second private key for the device and sign its certificate, using the root private key, as an "intermediate signing (CA)" certificate. Finally, export the root private key from the device for safe keeping, as it is the recovery key.

The intermediate signing device private key is a proxy for the original—because it's a signing (CA) certificate, it too can sign subsequent keys.

As before, any self-signed certificate can only assert ownership of its root private key, not an individual's identity. But all keys signed in a chain ultimately point back to the self-signed root private key for their authority, so they inherit its ownership. TLS chains created in this way are validated by following the chain from the last certificate to the root, validating signatures along the way.

All chains created with this root will be uniquely associated with any individual leaf certificate for a service. Once any leaf certificate establishes itself to the satisfaction of the service it represents, the unique identity of a chain's root certificate is associated with that specific user's identity. In other words, the root's certificate becomes the user 1D for all services that use it.

TLS always uses the whole chain, not just the leaf certificate, in making a connection. Thus, after the chain is validated, the service simply gets the root certificate, or a representation of it, to associate with the database record for any user.

This process greatly simplifies propagating credentials to new devices. Any device can sign intermediate signing certificates for any other device—that is, the user is in charge of giving credentials to any new device, which can sign for any service on that device. And if a device is lost, it can get new credentials from any existing device. If all devices are lost, the root key can be recovered from a recovery service.

This section describes the method for bringing a new Trusted Device into the user's Personal Certificate Authority, effectively migrating the user's credential to the new device.

Figure 2:
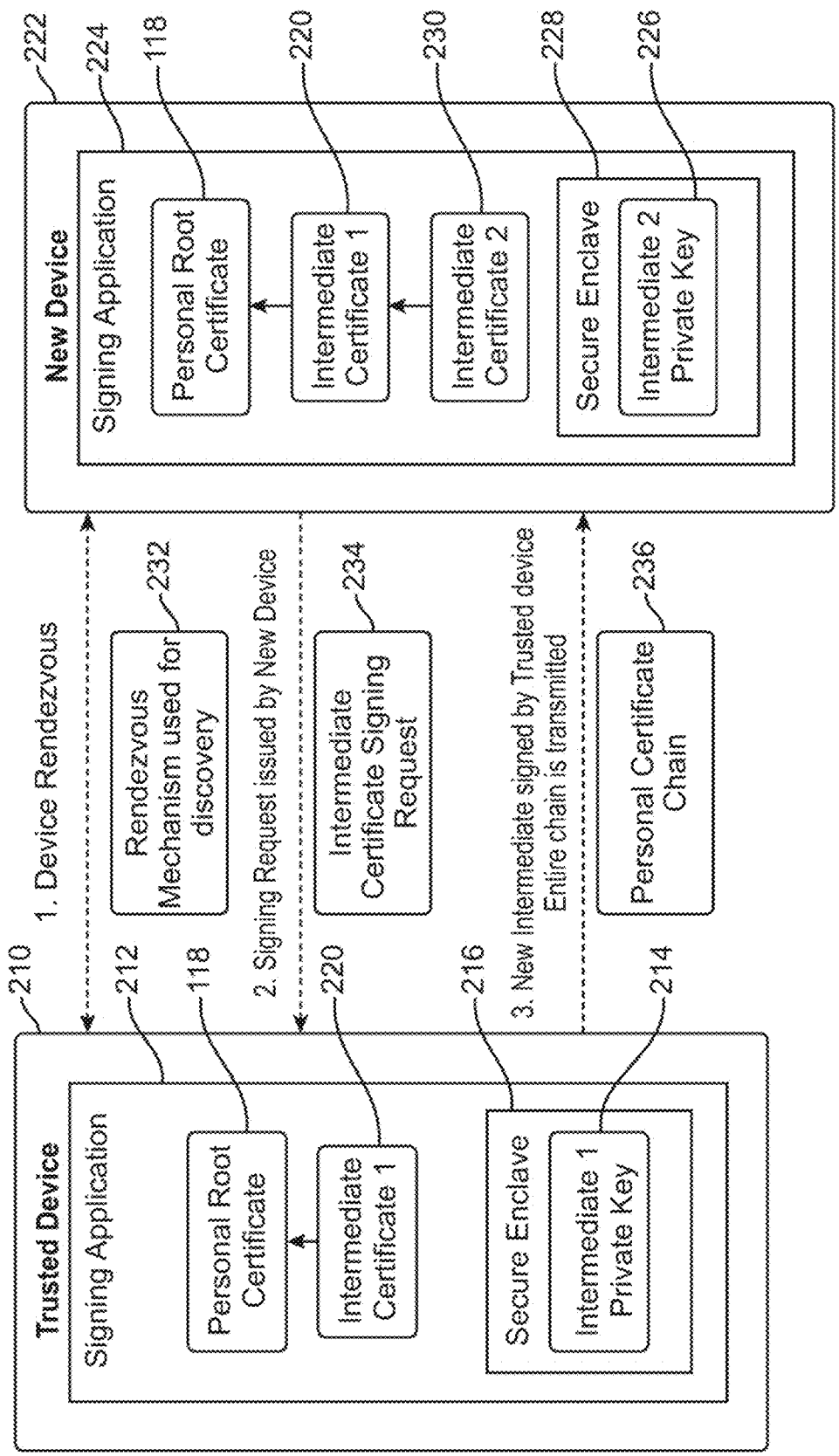
FIG. 2 is a diagram illustrating the process of credential migration between two Mobile Devices according to an embodiment.

FIG. 2 is a diagram illustrating the process of credential migration from an existing Trusted Device to a new User Device according to an embodiment. A trusted user device 210 (e.g., smartphone, tablet, computer, etc.) is assumed to already have the signing application 212 installed and initialized with an intermediate certificate and intermediate private key. (This could be the device of FIG. 1, or a subsequent device). The signing application 224 on the new device 222 includes the ability to create a private key 226 in a secure enclave 228. Private key 226 is used to sign a certificate signing request (CSR) 234, which is sent to Trusted Device 210 via a rendezvous method. The CSR is used to construct Intermediate Certificate 230, which is signed by intermediate 1 private key 214 in secure enclave 216 and sent back to Signing Application 224, along with Intermediate Certificate 1 (220 and Personal Root Certificate 118 for installation into its secure enclave. Device 222 now has the ability to sign other intermediate and leaf certificates on the user's Personal Certificate Authority.

The user may desire to provide the Personal Root Credential to a New Device 222, so that the user can issue Personal Certificate Chains from either device. First, the user installs (downloads) a Signing Application 224 onto device 222. The Signing Application 224 creates a new intermediate 2 Private Key 226, from its Secure Enclave 228 (e.g., HSM) and uses it to sign a Certificate Signing Request 234.

A connection is formed between the New Device 222 and Trusted Device 210 (note that Trusted Device 210 does not need to be the original user device, but can be any Trusted Device). In one embodiment, the connection uses a protocol implemented in gRPC (See https://grpc.io/ for details of the gRPC system) over standard TCP/IP. This is done using a Rendezvous Mechanism used for discovery 232 as described in more detail below. Discovery can be initiated by the Signing Application, or separately by the user with a standard communication mechanism on New Device 222.

The Signing Application 224 signs a Certificate Signing Request (CSR) 234 using intermediate 2 private key 226. Using the available Rendezvous Mechanisms 232, the Client Application sends the CSR 234 to a Signing Application 212 running on one of the user's Trusted Devices 210. The Signing Application 212 signs the new CSR using its intermediate certificate 220 and returns a Personal Certificate Chain 236 to the Signing Application 224 on New Device 222. The Signing Application 224 installs the Personal Certificate Chain (118, 220, 230) into its Secure Enclave 228 and can now use it to present the user's credentials to a Verifying Party. New device 222 is now a Trusted Device. The resulting Personal Certificate Chain 236 on the new Trusted Device 222 is longer by one intermediate certificate than the chain found on the Signing Application 212 of the original Trusted Device 210.

Migration Between Devices with a Self-Signed Leaf Certificate

As previously described, the new device constructs a CSR and sends it to the trusted device for signing by its intermediate certificate. The trusted device signs the new device's CSR and returns the signed, and extended certificate chain.

Along with returning the newly-signed certificate chain, the Trusted Device performs the following operations:

The Trusted Device bundles up its collection of self-signed leaf packages into a global data bundle set. The payload is then encrypted by the New Device's public key, as presented in its CSR. This encrypted payload is sent to the New Device along with its signed personal certificate chain. This New Device then uses its private key to decrypt the payload and install the new information into its system. Alternately, the New Device can obtain the self-signed leaf packages through a synchronization operation with the backup server, as described below.

Credential Backup

Since the database of the Trusted Device's self-signed leaf packages is not implicitly contained in the trusted device's personal certificate chain, it must be backed up to an external service in the cloud. This process is shown in FIG. 9 and described below.

Note that this process requires the signing application retain its Personal Root Private Key 908 within its Key Store 906 rather than discard it after back-up.

Whenever a new self-signed leaf certificate is created, the Trusted Device 902 stores it's self-signed leaf package within a data bundle in a group of data bundles 910 on its hard drive/disk 904. When created, the data bundle is assigned a data block handle 912, which is randomly generated. This data bundle is encrypted using the Trusted Device's Personal Public Key. This encrypted data bundle is sent to the cloud service 920 for storage. The connection to the cloud backup service is authenticated using the Personal Certificate Chain via TLS.

The cloud service stores the encrypted data bundle with other encrypted data bundles 916, keyed to its data block handle in a key-value database 918.

The self-signed leaf package is now stored encrypted on the cloud back-up service, and only the Personal Root Private Key can decrypt it. If the Personal Root Private Key is not stored in the back-up service, not even software in the cloud service can read the bundled data.

Credential Presentation to Verifying Party

This section describes a method for the intermediate private key in a Signing Application on a Trusted Device to issue a leaf certificate for the purposes of authenticating a user via a Personal Certificate Chain.

Figure 3:
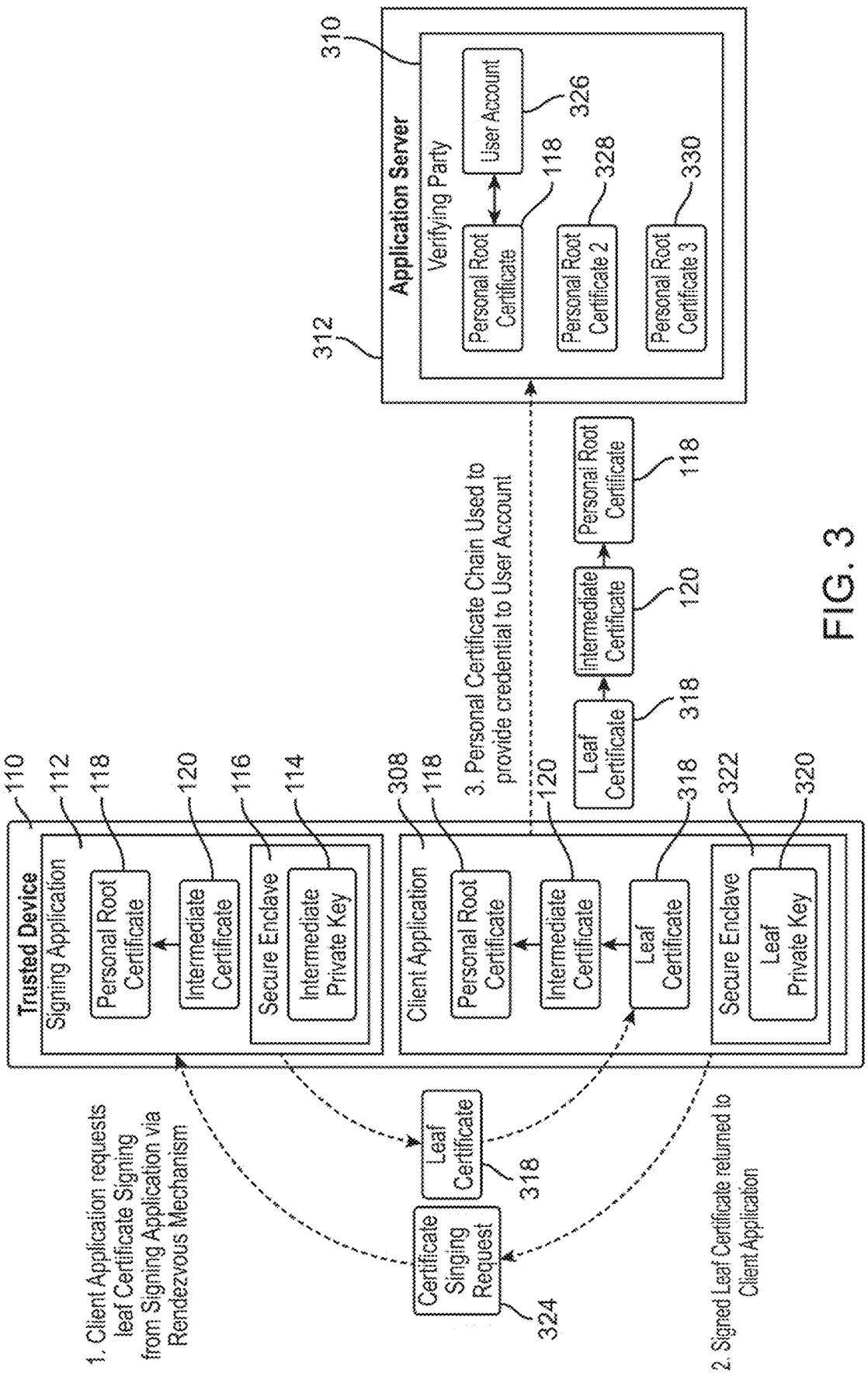
FIG. 3 is a diagram illustrating the process of Personal Credential Issuance to Client Applications and the use of said credential to authenticate against a Verifying Party according to an embodiment.

FIG. 3 is a diagram illustrating the process of Personal Credential Issuance to Client Applications and the use of said credential to authenticate against a Verifying Party according to an embodiment. The trusted device has the elements described above—a signing application 112, a Personal Root Certificate 118, an intermediate certificate 120, a secure enclave 116 and an intermediate private key 114. In addition, a client application (app) 308 is downloaded by the user from a particular website or merchant, such as Verifying Party 310 on application server 312.

Client application 308 includes a library provided to the verifying party (e.g., by the provider of the Signing Application) for compiling or linking into their client application. The library added to the Client Application 308 enables it to communicate with Signing Application 112 once downloaded onto device 110. The Client Application 308 creates a new leaf private key 320 in its secure enclave, and uses it to sign certificate signing request 324. Using available Rendezvous Mechanisms, the Client Application sends the CSR 324 to the Signing Application (which can be Signing Application 112 on the same device, or another Signing Application running on one of the user's other Trusted Devices). The Signing Application signs the new CSR using its intermediate certificate key 114 and returns the leaf certificate 318 and Personal Certificate Chain to the Client Application. The Client Application 308 installs the Personal Certificate Chain into its Secure Enclave 322 and can now use it to present the user's credentials to Verifying Party 310. In one embodiment, the Client Application is on a device different than the Trusted Device.

Client Application 308 provides the Personal Certificate Chain of leaf certificate 318, Intermediate Certificate 120 and Personal Root Certificate 118 as a certificate chain to the Verifying Party 310 on Application Server 312. This communication uses whatever protocol the Verifying Party requires. For example, such protocols can include client TLS, WebAuthn (See https://www.w3.org/TR/webauthn/ for details of the WebAuthn protocol) and Base64-encoded signed credential in the form of a JSON Web Token (See https://jwt.io/ for a description of the JSON Web Token). When the certificate chain is presented to the Verifying Party 310, they validate up the chain until they reach the Personal Root Certificate, which identifies the user to the Verifying Party system. Verifying Party 310 stores Personal Root Certificate 118 linked to a User Account 326. User Account 326 can contain the data identifying the user, such as name, address, phone number, email, credit card, etc. Verifying Party would similarly store Personal Root Certificates 328, 330 and other root certificates for other users, linked to their accounts.

There are multiple ways to communicate with a Verifying Party. Once endowed with a leaf certificate, a Client Application can perform a mutual TLS handshake with a server of the Verifying Party, or it can participate in a WebAuthn or similar exchange with the Verifying Party's API as described in more detail below with respect to FIG. 6.

Alternatively, the client application may wish to receive a self-signed leaf certificate to use as its credential. In this case, the client library sends a request asking for a self-signed leaf certificate. Included in this request, is the verifying party's service identifier.

The signing application searches its database for an existing self-signed leaf certificate associated with the given service identifier, and if none is found, one is created. The signing application returns the self-signed leaf certificate, along with its accompanying private key to the service via Rendezvous Mechanisms 232 described above.

The client installs the self-signed leaf certificate and its accompanying private key into its secure enclave and uses this single certificate as a credential for a TLS connection to the verifying party.

This process can be repeated for any number of services that wish to use a self-signed leaf certificate. Each unique to a specific service identifier.

Creating a Self-Signed Leaf Certificate

Within a Trusted Device, a key pair is generated and stored in the Key Store. This key is used to sign a single, self-signed certificate with the usage capability of a leaf certificate. This certificate is stored in a data bundle on the Trusted Device's disk.

Credential Recovery

Figure 4:
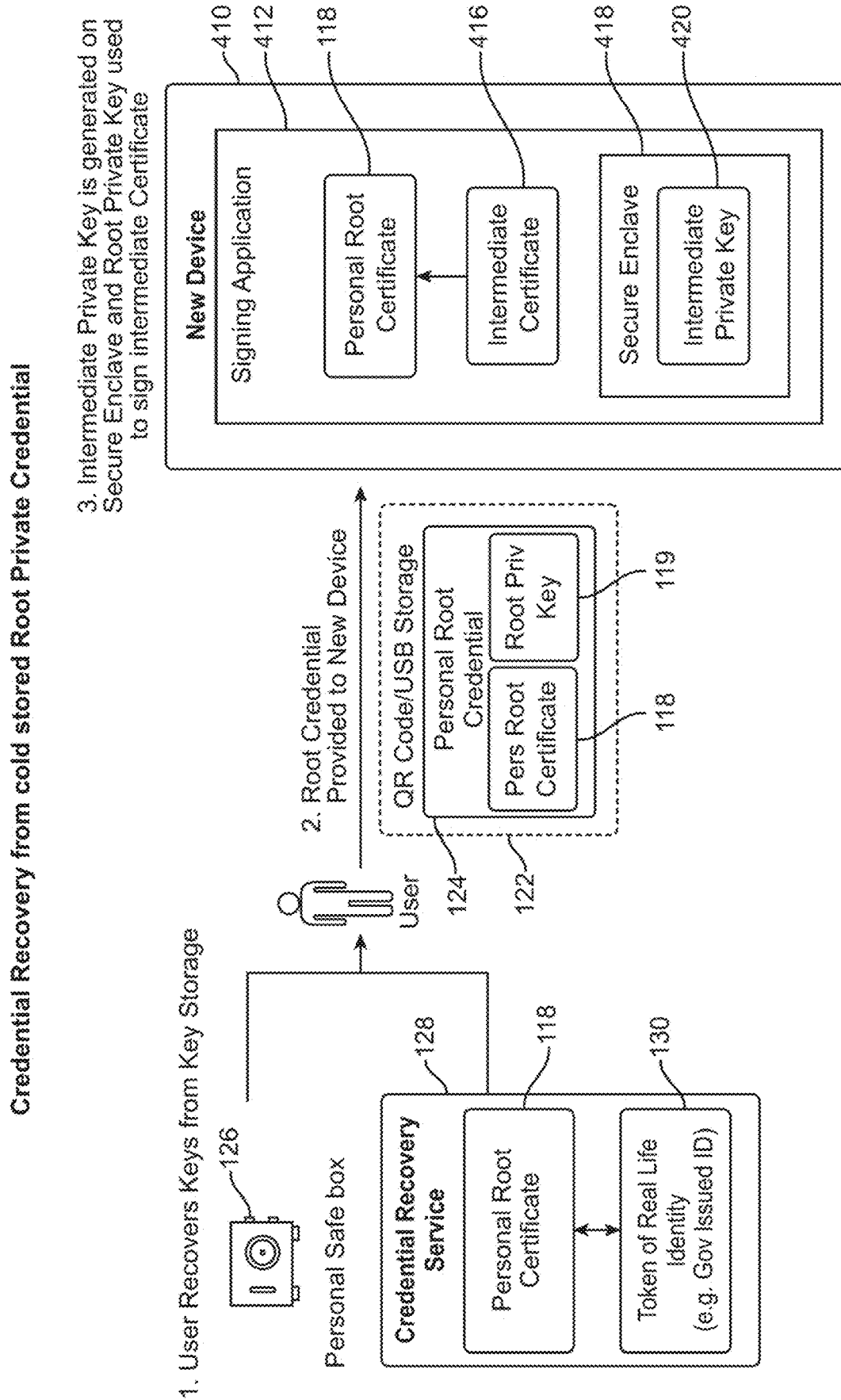
FIG. 4 is a diagram illustrating the process of credential recovery in case all Trusted Devices have been lost according to an embodiment.

This section describes how the user can recover their credential if all Trusted Devices are lost. In this case, they will have to recover their credential from their Personal Root Credential found in cold storage or in a Credential Recovery Service. FIG. 4 is a diagram illustrating the process of credential recovery in case all Trusted Devices have been lost according to an embodiment. This is to some extent the reverse of the storage process of FIG. 1.

The user installs the Signing Application 412 onto a new, Untrusted Device 410 and begins the Recovery process. The Signing Application 412 prompts the user to present the backed-up Personal Root Credential 124, which is read but not stored in the application's secure enclave. An Intermediate Private Key 420 is generated within the Secure Enclave 418 of the Signing Application 412, and its corresponding public key is used to create an Intermediate Certificate 416, which is signed by the recovered Personal Root Private Key 119.

The Personal Root Private Key 119 is deleted from the Signing Application 412 and is not used again unless another Credential Recovery is required. The intermediate private key 420 can now be used to sign other intermediate certificates or sign leaf certificates for credential delivery. The trust relationship between the Signing Application 412 and all Verifying Parties is retained based on the fact that the Signing Application continues to be able to sign certificates on a certificate chain that validate to the user's Personal Root Certificate. The Signing Application can also extend the chain to other user devices with Personal Root Certificate 118.

Where the user has generated one or more self-signed leaf certificates, where the Personal Root Private Key is stored in the Key Store for use with a self-signed leaf certificate, the signing application makes a TLS connection to the Credential Back-Up Service (Cloud Service 920 in FIG. 9) and requests all encrypted bundles associated with the Personal Root Private Key (in this case, the key associated with the client sentinel certificate). The Credential Back-Up service then sends a list of all data bundles to the device. The device decrypts the data bundles using the Personal Root Private Key and installs them into its database.

Credential Synchronization

Since each of the user's trusted devices uses the same Personal Root Private Key, whenever a new credential is pushed to the back-up service, the user's other trusted devices can connect to the service using their own Personal Certificate Chain and request any new encrypted data bundles. These bundles can be delivered to the device, decrypted, and incorporated into its database. This allows the user to have the same set of self-signed leaf packages on all of their devices.

Personal Root Credential Storage

Credential recovery requires accessing the Personal Root Credential from protected storage. This section describes in more detail mechanisms for securely storing the Personal Root Credential offline, or in a protected cloud service and how they may be used to recover the user's credential as illustrated in FIG. 4.

Personal Root Private Key Cold Storage

Using this mechanism, the user's Personal Root Credential is stored offline in a secure physical location by the user. When restoring a user's credential, the Signing Application is downloaded onto a new device and the copy of the Personal Root Credential is used to sign an intermediate certificate and establish a new Trusted Device. Possible cold storage mechanisms include:

QR Code

On CA creation, a single-page document displaying a QR code containing the Personal Root Credential is printed. This document is stored in a physically secure location such as a locked filing cabinet or safe. When needed for recovery, the user will scan this QR code with a newly installed copy of the Signing Application. The recovered Personal Root Credential is used to sign a new intermediate certificate, which can be used henceforth to sign new intermediate and leaf certificates in the Personal Certificate Chain.

USB Stick or Security Key

On CA creation, a USB stick is inserted into the device, where the Personal Root Credential is stored in a standard location. This USB stick is stored in a physically secure location such as a locked filing cabinet or safe. When needed for recovery, the user will be prompted to insert the USB stick or security key by a newly installed copy of the Signing Application, where it will read the Personal Root Credential from the standard location and use it to sign a new intermediate certificate, which will be used henceforth to sign new intermediate and leaf certificates in the Personal Certificate Chain.

Credential Recovery Service

Using this mechanism, the user has their Personal Root Credential backed-up to a cloud-based Credential Recovery Service in case they lose all of their Trusted Devices. When needed for recovery, the user enters their Credential Recovery Service credentials into a newly-installed Signing Application, which reads the Personal Root Credential and uses it to sign a new intermediate certificate, used henceforth to sign new intermediate and leaf certificates in the Personal Certificate Chain.

Rendezvous Mechanisms

The Personal Certificate Authority is running on multiple personal devices that need to communicate with each other in order to sign certificates on behalf of Client Applications or unregistered Signing Applications. Additionally, the Verifying Party cloud services may need to request credential signings from one of the users Trusted Devices. This section describes mechanisms that may be used to rendezvous communication between these devices.

Direct Application Communication

Two devices can contact each other directly using industry-standard discovery methods. These include:

Bluetooth® LE

The Bluetooth® LE protocol provides for ad hoc device discovery and direct communication between two different devices within close proximity of each other.

ZeroConf Discovery

Known as Bonjour on Apple computers, a peer-to-peer connection may be established by two different applications registering their presence on a Local Area Network using the ZeroConf mechanism.

Android Peer Discovery

Android has a similar peer-to-peer discovery method to ZeroConf.

Any other method may be used as well.

Cloud-Based Rendezvous

Cloud-based rendezvous involves registering a secret, time-limited rendezvous code that is then transferred to the other application, which uses it to establish a connection on a cloud service to exchange data between the two applications. The methods described below are used to exchange this secret. They typically don't have the capacity to exchange the entire payload necessary for signing, or only provide uni-directional communication.

Application Scheme

One application can invoke another application on the same device by sending the operating system a small string in the form of a URL (on the order of 1024 bytes). When invoked, an application will move to the foreground, read the URL and perform an action based on the URL contents. The initiating application requests the rendezvous from the cloud service, which returns a rendezvous code. The initiating application opens the receiving application using an Application Scheme. The receiving application opens a connection to the cloud service, providing the rendezvous code to complete the connection.

QR Code

The initiating application requests the rendezvous from the cloud service, which returns a rendezvous code. The initiating application displays the rendezvous code as a QR code on its display, which the receiving application scans with its camera. The receiving application opens a connection to the cloud service, providing the rendezvous code to complete the connection.

Push Notification

The initiating application requests the rendezvous from the cloud service, which returns a rendezvous code. The initiating application requests that a push notification be sent to the receiving device. This push notification contains the rendezvous code. The receiving application opens a connection to the cloud service, providing the rendezvous code to complete the connection.

Near Field Communication (NFC)

The initiating application requests the rendezvous from the cloud service, which returns a rendezvous code. The initiating device sends the rendezvous code out via an NFC transmitter, which the nearby receiving application can read. The receiving application opens a connection to the cloud service, providing the rendezvous code to complete the connection.

Certificate

Figure 5:
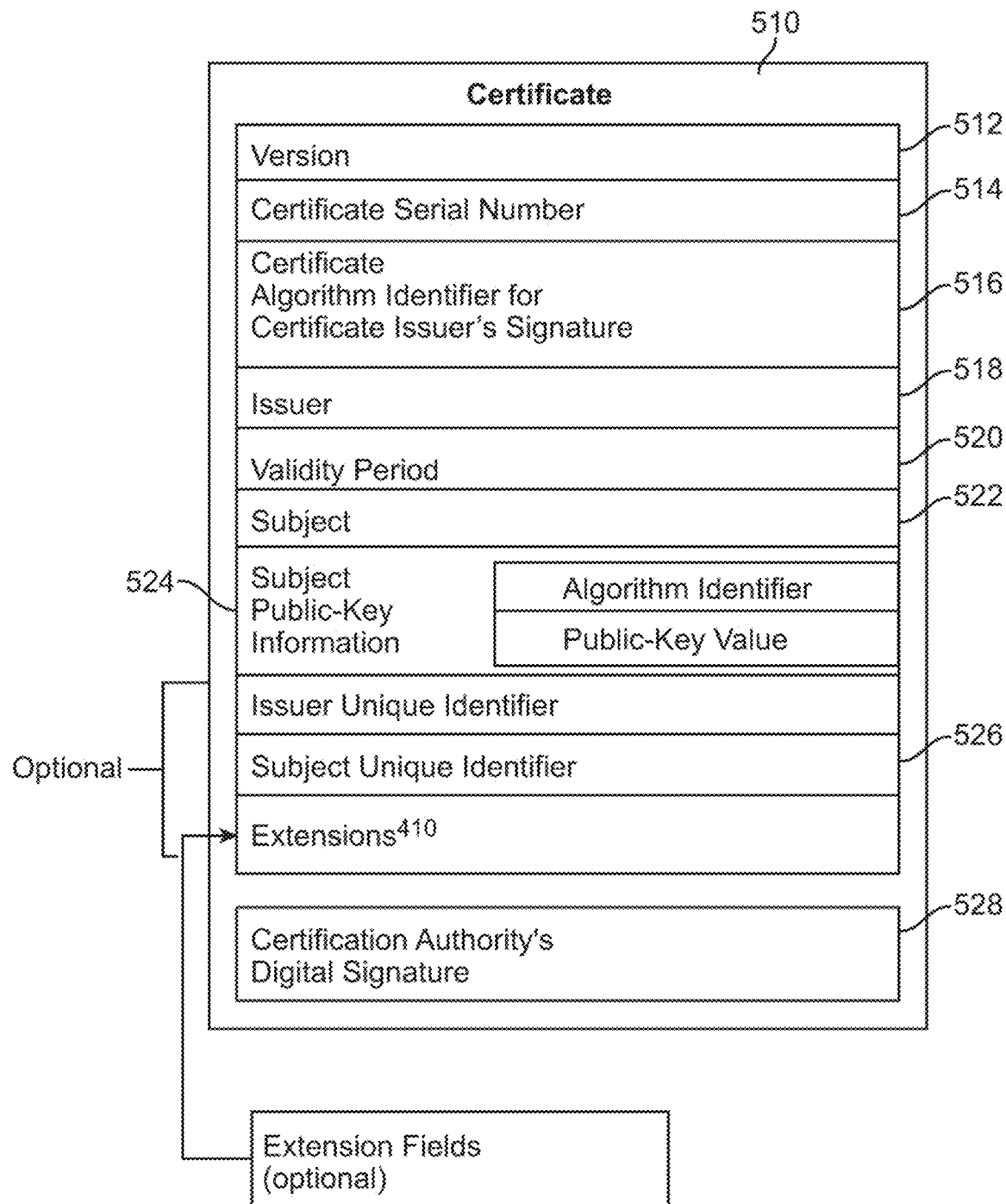
FIG. 5 is a diagram illustrating the fields of a certificate according to an embodiment.

FIG. 5 is a diagram illustrating the fields of an X.509 certificate according to an embodiment. Standard certificate fields are used in one embodiment, but are populated differently. Certificate 510 contains a version field 512, a certificate serial number 514 (unique for all certificates in the Personal Certificate Authority), and a Certificate algorithm identifier field 516 (describing how the certificate contents were hashed, and the algorithm used to sign the hash). An issuer field 518 would normally have a copy of the subject field of the certificate that signed. Here, it is left blank because the subject is left blank, for the reasons set forth below.

Field 520 is a validity period, which would set forth the expiration date of the certificate. This may be set to a very long period (e.g., until the year 9999), so a user is not faced with the hassle of creating a new certificate. A subject field 522 is left blank or one or more of its fields are filled with a random or arbitrary numbers. In a traditional CA certificate, this would describe a company, with its location, phone number, address, email, etc. However, since the purpose of the user certificate in this application is to replace a password with a public key, where it doesn't matter if it is intercepted, it would be counterproductive to include other private, identifying information of the user. Instead, such information is separately linked in a user account at a verifying party as discussed above.

Field 524 contains the public key information, with an algorithm identifier and a public-key value. This will be a different public key for each certificate. Optional and extension fields 526 can include a variety of data, including identifying whether the certificate is an intermediate certificate or a leaf certificate. Field 528 includes the Certification Authority's Digital Signature. In the present system, the CA is the user.

Authentication Through Browser, without an App

Figure 6:
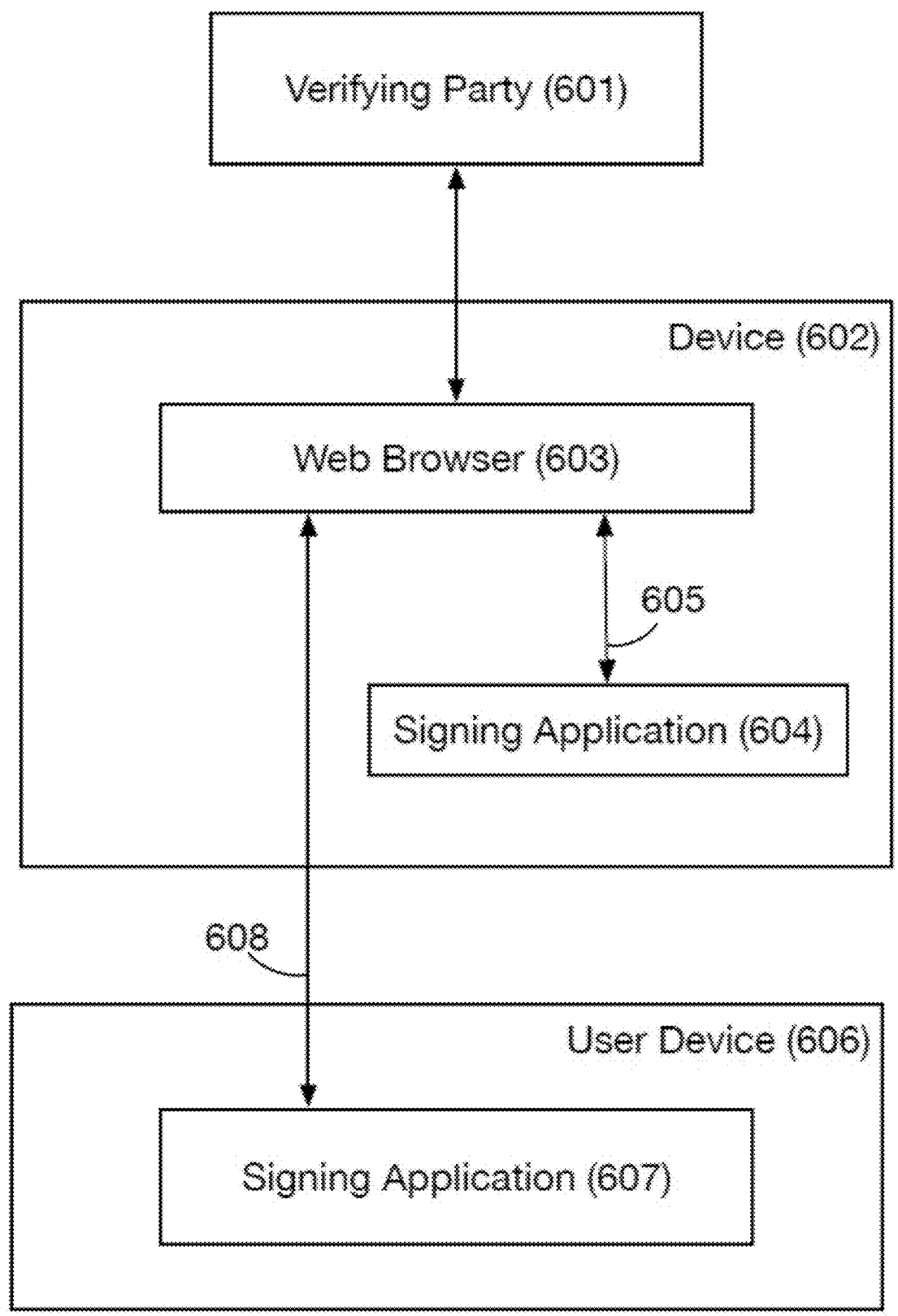
FIG. 6 is a diagram illustrating the process of authenticating a user to a verifying party through a browser instead of an app, such as through the proposed WebAuthn protocol, according to an embodiment.

FIG. 6 is a diagram illustrating the process of authenticating a user to a verifying party through a browser instead of an app, such as through the proposed WebAuthn protocol, according to an embodiment. A user uses a browser 603 on a device 602 to communicate with a verifying party 601, such as a website for a merchant, bank, etc. The user's private key is kept in a Signing Application 604 or in a Signing Application 607 on an external device 606. In the proposed WebAuthn standard, the browser 603, upon the registration or the authorization ceremony, will seek authenticators internally or externally. If device 602 is a trusted device, meaning it has a Signing Application with an intermediate key, and a signed intermediate certificate anchoring at the user's Personal Root Certificate, then the browser 603 on device 602 will forward a signing request to Signing Application 604 for authentication operations via an internal mechanism 605.

Another way this could be used in the embodiment is that external device 606 could register as an authenticator wirelessly to device 602 such as through Bluetooth LE or NFC, or external device 606 could be physically attached to device 602 via USB cable. In in any of these cases, trusted device 606 acts as an external authenticator to browser 603. Once the external connection 608 is established, the browser will forward signing requests to Signing Application 604 for authentication operations. In one embodiment, external device 606 is a USB memory, a disk drive or other memory device, or is a smartphone, Personal Digital Assistant (PDA), or any other electronic device.

Authentication Via Cloud Rendezvous

Figure 8:
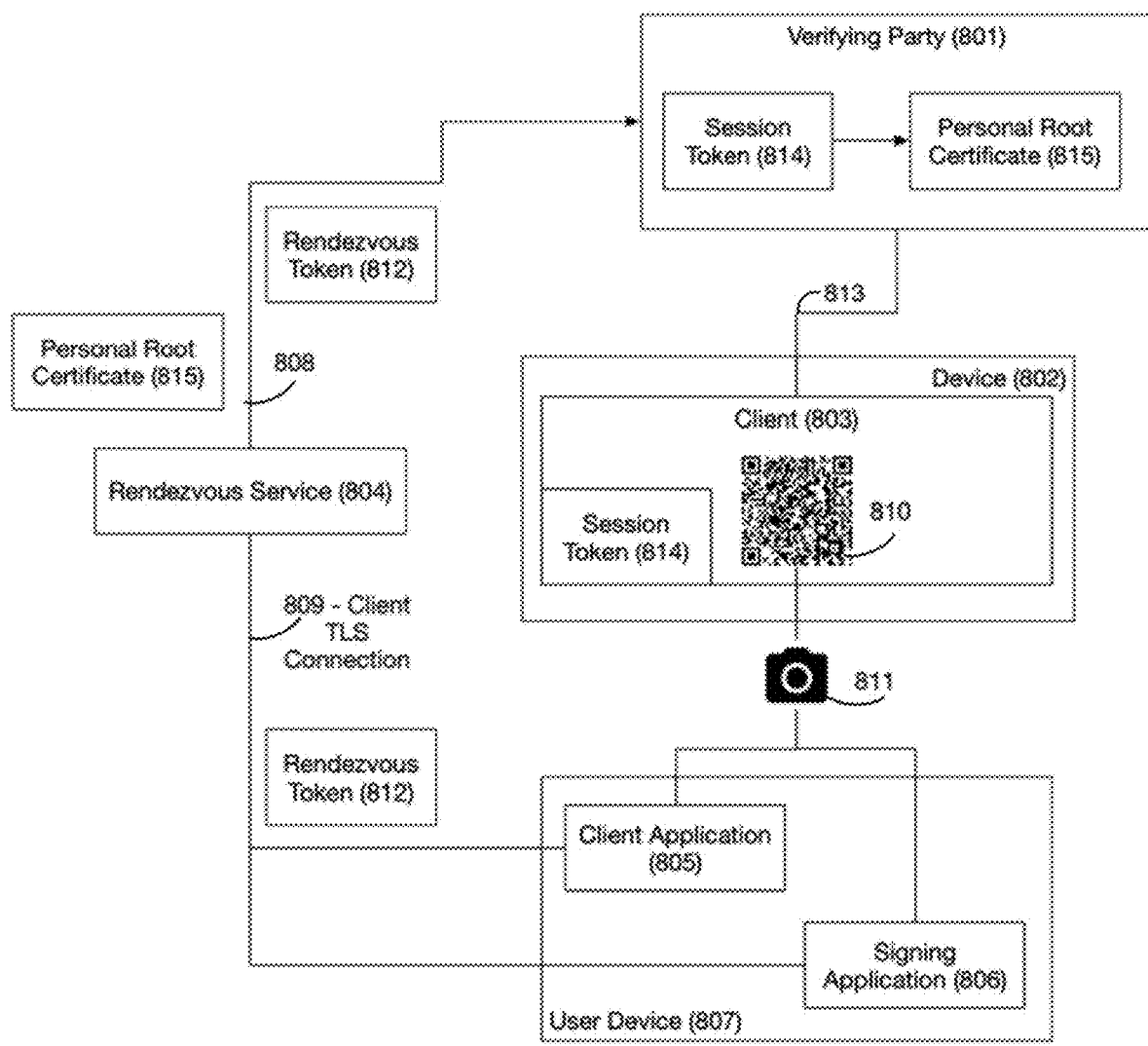
FIG. 8 is a diagram illustrating the process of authenticating a user to a verifying party by way of cloud-rendezvous using a QR code, according to an embodiment.

FIG. 8 is a diagram illustrating the process of authenticating a user to a verifying party by way of cloud-rendezvous using a QR code. Verifying Party 801, using our supplied server libraries of the embodiment, establishes a connection 808 to a cloud-based Rendezvous Service 804 and requests a user credential for use on its Client 803 on device 802. Client 803 could be a web browser, or perhaps proprietary software on a kiosk or exercise equipment. The Rendezvous Service 804 generates a rendezvous token 812 and returns it to the Verifying Party 801, which renders it in the form of a QR code 810 and sends it via a connection 813 for display on its client 803. After presenting a scan page with QR code 810, the client 803 and Verifying Party 801 maintain a persistent connection 813 to complete the authentication process. If the client is a web browser, then this can be performed via a Web Socket connection. If the client is an application, then the connection between Client 803 and Verifying Party 801 must be kept open until after the user credential is delivered.

The User, utilizing their user device 807, opens either Verifying Service 801's client application 805, or the Signing Application 806 if no client application is installed on User Device 807. In either case, the user initializes a scan with the camera 811 on user device 807. The scanning application reads the rendezvous token 812 from QR code 810 and establishes a client-authenticated TLS connection 809 using the user's personal certificate chain including Personal Root Certificate 815 as a credential to the rendezvous service 804. This establishes that the connecting entity is from an application that validates to the user's Personal Root Certificate 815. Once connection 809 is established the client application 805 or the signing application 806 sends the rendezvous token 812 to the cloud service 804 and closes the connection. The cloud service forwards the user's personal root certificate 815 to the Verifying party 801 via connection 808 and closes the connection.

Verifying Party 801 generates a session token 814 and associates it with the user's Private Root Certificate 815. It then sends a refresh command to the client via connection 813. This command contains the generated session token that client 803 retains and presents as the user credential for the duration of the session's validity. If the client is a web browser, this session token is stored as a cookie in the browser, if the client is an application, then the mechanism of session token presentation is application-specific. This validity duration of the session is specified by the Verifying Party 801 at the time of its creation.

Authentication Server for Legacy Password Websites.

Essentially all existing credentials today are based on the user-name combined with a password. Thus, conversion to a certificate-based system as specified herein is problematic. What is needed is a system that allows change gradually, as users and websites adopt the certificate system, and as websites have some users on a legacy password system, and others on a certificate system.

Figure 10:
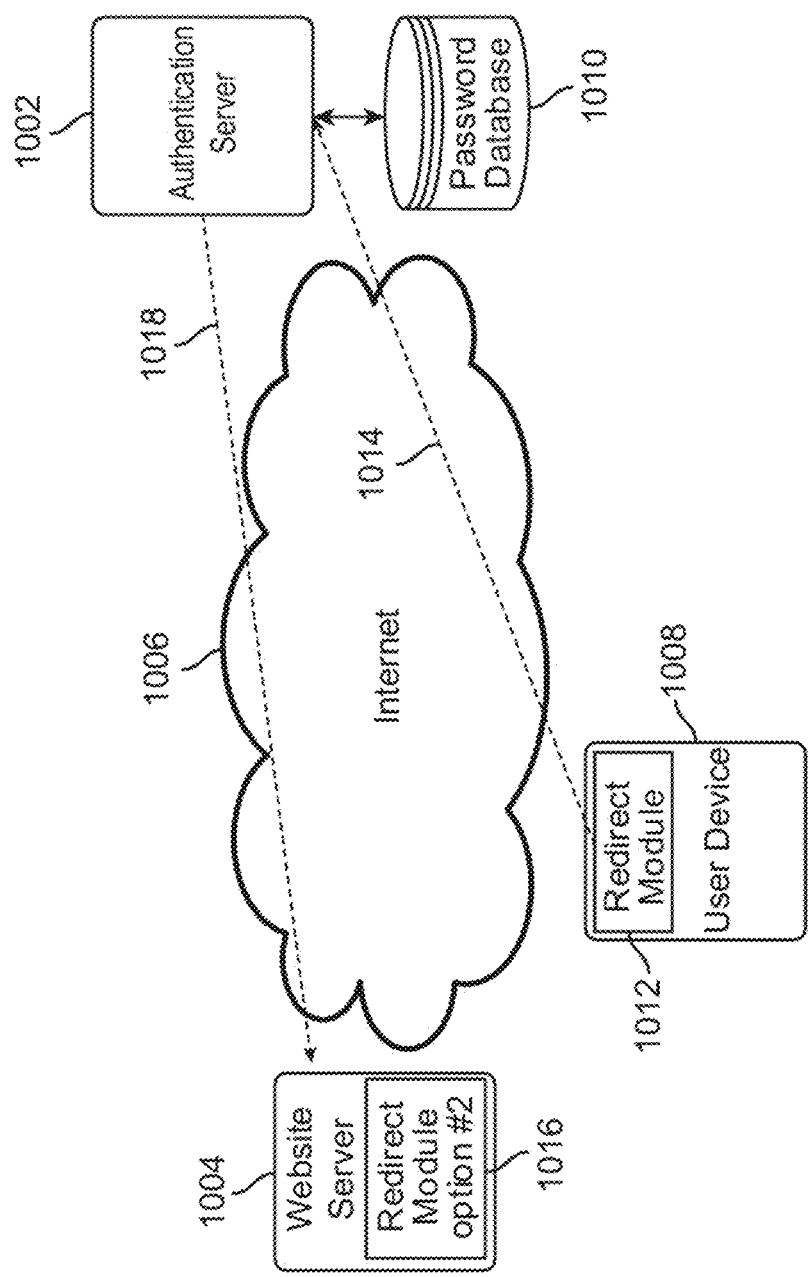
FIG. 10 is a diagram illustrating an embodiment of an authentication server.

In one embodiment, as illustrated in FIG. 10, a preprocessing Authentication Server (AS) 1002 is used as transient convenience in converting all users. The entire login process is redirected to it. AS 1002 connects securely to the normal password processing system of a website server 1004 through the Internet 1006, and all future logins from user device 1008 occur through it. Once fully converted, the site can incorporate certificates natively in its server 1004, eliminate the AS 1002 from the login path, and remove all passwords completely.

As used herein, the term "website server" or "website" can alternately be any other computer to which a connection is desired, or an application on or off a user device, not just website computers. For example, it could be a database accessed without an associated website. Also, the Internet as shown can instead be a WAN or LAN or any other network. Accordingly, although a website server is used herein as an example, it should be understood that the present invention is more broadly applicable to any communication between processing devices.

AS 1002 holds the certificate, user-name and password for each user in a database 1010. Separate user names and passwords for separate websites are stored, with the same or different certificates. A user device 1008 has a redirect module 1012 (e.g., downloaded software) that redirects a login attempt to AS 1002 along a path 1014 through the Internet 1006. Alternately, a redirect module 1016 is located on website server 1004, with user device 1008 contacting the website server 1004 as usual, and redirect module 1016 directing the login message to AS 1002 AS 1002 translates an incoming redirected certificate to an outgoing user-name and password to use as input to the standard legacy password checking system of website server 1004, sends the username and password along path 1018 across the Internet 1006 to website server 1004, and returns to the user any login tokens and state received in response.

In one embodiment, website server 1004 may convert to a certificate credential system, and itself provide for transitioning its own users. A user, after entering a user name and password, may be prompted to convert to the certificate credential system. In response to such a prompt, signing software on the user device can provide a certificate chain to website server 1004. If the user device does not have signing software to create a certificate chain, the user can be prompted by website server 1004 to download such software. Once the user device provides the certificate chain, the user device can be prompted to provide the certificate chain on subsequent logins. This can be done by a redirect from the standard login page of website server 1004. Alternately, a URL for a separate certificate login page can be provided to user device 1008.

In another embodiment, login attempts are redirected to AS 1002. The initial login attempt would include, in one or more messages, the certificate chain along with the legacy login name and password credentials. In one embodiment, such redirection occurs after an attempt to login directly to website server 1004 with a certificate chain, and receiving an error message.

The provided login and password is forwarded on to the normal password processing system of website server 1004 for authentication. If successful, the certificate, user-name and password are entered into AS database 1010 for future use. The normal login path for this user can then be disabled, depending on the policy of the service. Future logins will automatically be through providing a certificate chain to AS 1002, which will then provide the user name and password.

In one embodiment, once AS 1002 has an authenticated login and password, it can change them to make them more random. The password can also be changed periodically, or even after every access to website server 1004. Because the user device simply provides the same credential chain each time, complicated passwords can be associated with it in password database 1010, and can be changed frequently, completely opaquely to the user, who does not have to remember the passwords. AS 1002 can include software capable of reading a login page to determine the password requirements so that the requirements are met, and the maximum allowed length password is used. This can also alternately be determined through trial and error. If the login page requires image identification as part of a CAPTCHA routine, or other security features that AS 1002 is not able to handle, the login page can be redirected to the user device to enter the responses, or the login page information can be scanned and provide to the user device to provide answers. The user answers can then be provided to AS 1002, which can enter the user responses to the login page. The user can provide answers to security questions to AS 1002, so that AS 1002 can respond to challenges (e.g., town of birth, mother's maiden name, etc.).

Website server 1004 may initially accept both normal password logins and those made with a certificate. New users may be required to download a signing application and register using a certificate chain. Legacy users will be able to continue using their passwords, but will be prompted to adopt the certificate approach. Various incentives to adopt certificates can be provided, such as unlocking additional features or simply noting the added security. Once a user has converted to certificate credentials, the normal password-only process can be disabled by AS 1002 for that user. And once all users have converted to the new credentials, certificate credential checks can be incorporated directly into website server 1004, and the Authentication Server 1002 can be removed from the path. The main reason for this final step is to remove passwords completely from the system.

If the user does not have an existing account with website server 1004, first-time login is done by the first-time process described above, but in addition AS 1002 inserts a random user-name and password, which are forwarded to the password-based system of website server 1004 for account creation. This may require AS 1002 to obtain additional information from the user, such as name, email address, street address, credit card information, etc. AS 1002 can ping user device 1008 for this information, or simply redirect the account creation page of website server 1004 directly to user device 1008. Successful user identity determination by the webs to server 1004 causes account creation. Then the user-name, password and certificate are entered into the AS's password database 1010 before returning the login acceptance tokens to the user.

Account deletions can be administratively handled by invalidating the certificate or by administrative login to AS 1002.

Passwords are often limited in length in existing systems. Otherwise, the certificate or its representation could simply replace the password in a user-account using a simple "change password" command, because an affirmative comparison is all that's needed.

Computer Systems for Media Platform and Client System

Figure 7:
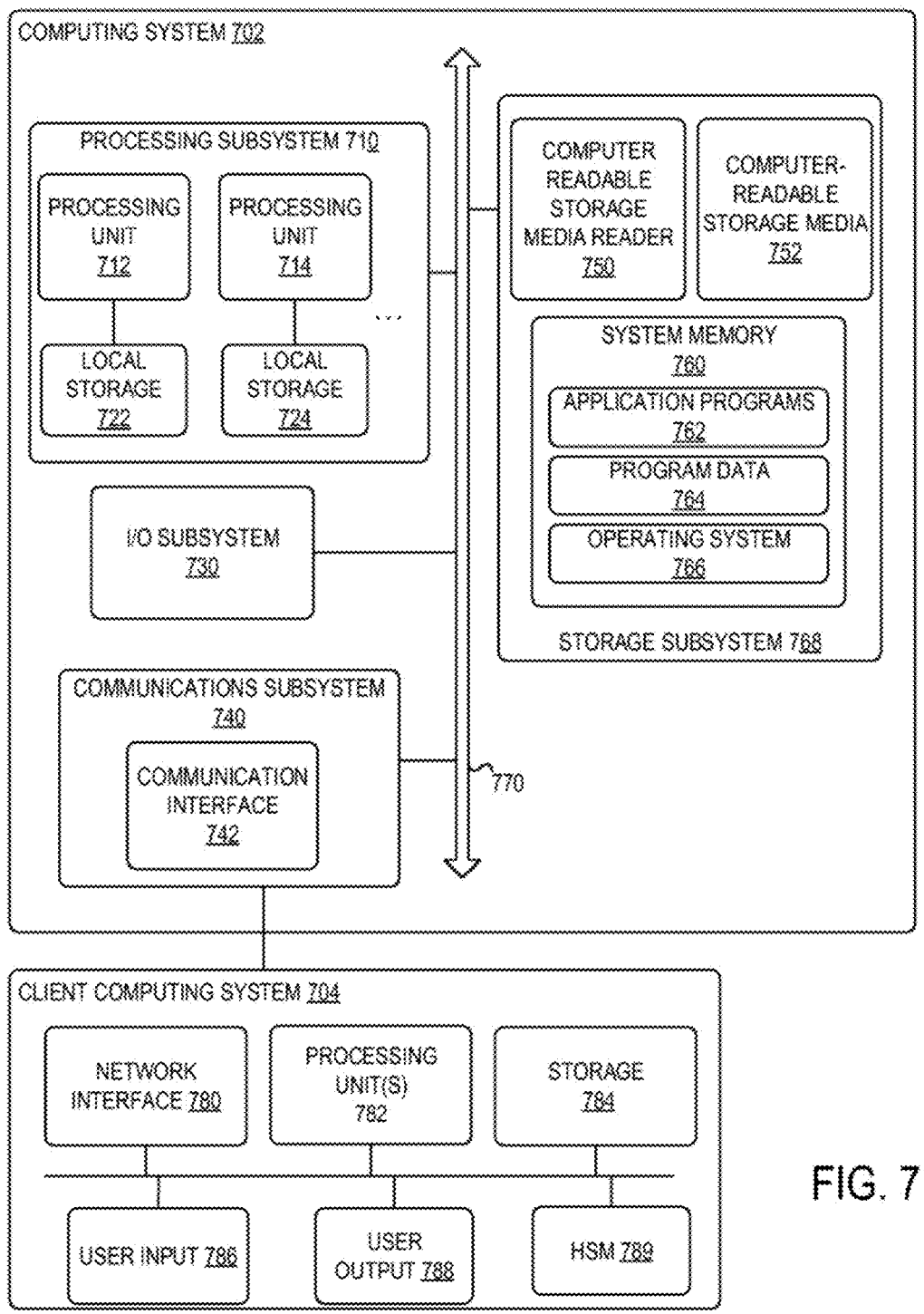
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the server or website computing system or other verifying party, or any other computing system described herein or portions thereof. Client computing system 704 or similar systems may implement user devices such as a smartphone, tablet, computer, smart watch, or other devices.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or nonvolatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read and write memory device or a volatile read and write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a nonvolatile read and write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in readonly memory and/or program code stored in nonvolatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or nonlocal storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., WiFi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user owned or user operated devices via a wide area network such as the Internet. An example of a user operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 also includes a Hardware Security Module (HSM) 789. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as WiFi, Bluetooth®, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light emitting diode (LED) including organic light emitting diodes (OLED), projection system, cathode ray tube (CRT), or the like, together with supporting electronics (e.g., digital to analog or analog to digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here.

Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer readable storage medium).

Thus, although the invention has been described with respect to specific embodiments, it will be appreciated that the invention is intended to cover all modifications and equivalents within the scope of the following claims.

What is claimed is:

1. A method for authenticating a user to a verifying party computer over a network, comprising:
    generating a self-signed root user certificate signed by a root private key on a user device, wherein the signing of the self-signed root user certificate by the root private key occurs on the user device;
    generating an intermediate private key in a secure enclave on the user device;
    signing an intermediate certificate with the root private key;

linking the intermediate certificate to the self-signed user root certificate by way of signature to form a certificate chain, the certificate chain including a public key corresponding to the intermediate private key;

transmitting the certificate chain to the verifying party computer over the network;

transmitting user identification data to the verifying party computer for linking with the certificate chain; and transmitting the certificate chain to the verifying party computer in a subsequent communication to identify the user without the user identification data.

2. The method of claim 1 wherein the certificate chain is used to identify the user instead of identifying the user with a password at the verifying party computer.

3. The method of claim 1 wherein the self-signed user root certificate is an X.509 certificate suitable for use with Transport Layer Security (TLS).

4. The method of claim 1 further comprising verifying, by the verifying computer, with Transport Layer Security (TLS) that the certificate chain belongs to the user device.

5. The method of claim 1 further comprising:
storing, by the user device, the intermediate private key in a signing application in a memory of the user device.

6. The method of claim 1 further comprising:
storing, by the user device, the root private key in the secure enclave.

7. The method of claim 1, wherein the root private key is created outside the secure enclave.

8. The method of claim 1 further comprising:
downloading a signing application; and
creating the root private key with the signing application.

9. The method of claim 1 wherein the certificate chain contains no user-specific information, with the user being verified by the public key.

10. A non-transitory computer readable medium having stored thereon software instructions that, when executed by a processor, cause the processor to generate control signals for authenticating a user to a verifying party computer over a network, by executing the steps comprising:

generating a self-signed root user certificate signed by a root private key on a user device, wherein the signing of the self-signed root user certificate by the root private key occurs on the user device;

generating an intermediate private key in a secure enclave on the user device;

signing an intermediate certificate with the root private key;

linking the intermediate certificate to the self-signed user root certificate by way of signature to form a certificate chain, the certificate chain including a public key corresponding to the intermediate private key;

transmitting the certificate chain to the verifying party computer over the network;

transmitting user identification data to the verifying party computer for linking with the certificate chain; and transmitting the certificate chain to the verifying party computer in a subsequent communication to identify the user without the user identification data.

11. The non-transitory computer readable medium of claim 10 wherein the steps further comprise:
storing, by the user device, the intermediate private key in a signing application in a memory of the user device.

12. The non-transitory computer readable medium of claim 10 wherein the steps further comprise:
creating the root private key with a signing application on the user device.

13. The non-transitory computer readable medium of claim 12 wherein the steps further comprise:
downloading the signing application over the network to the user device.

14. The non-transitory computer readable medium of claim 10 wherein the steps further comprise:
storing the root private key on the user device.

15. The non-transitory computer readable medium of claim 10 wherein the certificate chain is used to identify the user instead of identifying the user with a password at the verifying party computer.

16. A method of identifying a user comprising:
generating a self-signed root user certificate signed by a root private key on a user device, wherein the root private key is stored on the user device, and the signing of the self-signed root user certificate by the root private key occurs on the user device;

generating an intermediate private key in a secure enclave on the user device;

signing an intermediate certificate with the root private key;

linking the intermediate certificate to the self-signed user root certificate by way of signature to form a certificate chain, the certificate chain including a public key corresponding to the intermediate private key;

transmitting the certificate chain to a verifying party computer over a network;

transmitting user identification data to the verifying party computer for linking with the certificate chain; and transmitting the certificate chain to the verifying party computer in a subsequent communication to identify the user without the user identification data.

17. The method of claim 16 further comprising:
storing the root private key on the user device.

18. The method of claim 17 further comprising:
storing the intermediate private key in the secure enclave on the user device.

\* \* \* \* \*